Patented Aug. 31, 1954

2,688,008

UNITED STATES PATENT OFFICE 2,688,008

MIXED ACRYLONITRILE POLYMERS

David W. Chaney, Nether Providence Township, Delaware County, and Howard M. Hoxie, Chester, Pa., assignors to American Viscose Corporation, Wilmington, Del., a corporation of Delaware No Drawing. Application April 26, 1950, Serial No. 158,332

1 Claim. (Cl. 260—45.5)

This invention relates to new compositions of matter, and to shaped articles formed therefrom.

It has been found that valuable compositions are obtained by blending a base acrylonitrile polymer containing, in the molecule, at least 90 percent by weight of acrylonitrile with from 2 to not more than 50 percent on the weight of the blend of a modifying polymeric material which is soluble in dimethylacetamide, and which, when mixed with the base polymer in the stated amounts, results in a blend which will form a solution of at least 5 percent concentration in dimethylacetamide, which solution can be formed into fibers by conventional procedures.

The base polymers used in the blends of this invention have an average specific viscosity of not less than 0.2 or greater than 1.0, calculated for 0.2 gms. of the polymer in 100 ccs. of dimethylformamide. The blends of the invention have an average specific viscosity within the same range.

The base polymer may be polyacrylonitrile or it may be a copolymer containing in addition to acrylonitrile up to 10 percent of any other, different, mono-olefinic substance which is copolymerizable with acrylonitrile. Such copolymerizable substances include acids such as acrylic, alpha-chloracrylic, and methacrylic acids; esters such as methyl methacrylate, ethyl methacrylate, butyl methacrylate, α-chlorethyl methacrylate, and the corresponding esters of acrylic and alpha-chloracrylic acids; vinyl halides such as vinyl chloride, vinyl bromide, vinyl fluoride, vinylidene chloride, 1-chloro-1-brom-ethylene, vinylidene bromide, 1-fluoro-1-chlorethylene, and 1,1-difluoroethylene; nitriles such as methacrylonitrile, fumaronitrile, and alpha-chloracrylonitrile; amides such as acrylamide, methacrylamide, and alpha-chloracrylamide or their monoalkyl substitution products; ketones such as methyl vinyl ketone and methyl isopropenyl ketone, vinyl carboxylates such as vinyl acetate, vinyl chloracetate, vinyl propionate, and vinyl stearate; vinyl-substituted heterocyclic tertiary amines including the various isomeric vinylpyridines such as 2-vinylpyridine, 3-vinylpyridine, and 4-vinylpyridine, the vinyl-substituted alkyl pyridines such as 4-ethyl-2-vinylpyridine, 5-ethyl-2-vinylpyridine, 4-methyl-3-vinylpyridine, 5-ethyl-3-vinylpyridine, 4,6-dimethyl - 2 - vinylpyridine, 2 - methyl-5 - vinylpyridine, and 6-methyl-2-vinylpyridine, the vinylpyrazines, the alkyl-vinylpyrazines, the isomeric vinylquinolines, the vinyl oxazoles, the vinyl imidazoles, and the vinyl benzoxazoles; N-vinylimides, such as N-vinylphthalimide, N-vinyltetrahydrophthalimide, and N-vinylsuccinimide; methylene malonic esters, itaconic acid and itaconic esters; trifluorochlorethylene; N-vinylcarbazole; vinylfurane; vinyl sulfones such as butyl vinyl sulfone and ethyl vinyl sulfone; olefins such as ethylene, propylene, isobutylene, butene-1 and butene-2; alkyl vinyl ethers; vinylsulfonic acid; ethylene-alpha-beta-dicarboxylic acids or their anhydrides or derivatives such as diethyl fumarate, diethyl maleate, diethyl citraconate, diethyl mesaconate; styrene; vinyl-naphthalene, and the like.

In one preferred embodiment of the invention, the base polymer is a copolymer containing from 92 to 98 percent of acrylonitrile and from 2 to 8 percent of the other mono-olefinic copolymerizable substance or substances.

The modifying polymeric material may be a copolymer of acrylonitrile containing, in the molecule, from 10 to 70 percent by weight of acrylonitrile and from 30 to 90 percent of any one or more of the mono-olefinic substances other than acrylonitrile listed above. However, the modifying polymeric material does not have to be an acrylonitrile polymer, so long as it is compatible with the base polymer and satisfies the requirements as to solubility in dimethylacetamide stated above.

In general, the blends of the invention are characterized by unexpectedly high heat-stability, and articles, such as fibers, formed therefrom exhibit excellent resistance to shrinkage at elevated temperatures. For example, fibers formed from a blend of a base acrylonitrile polymer containing, in the molecule, at least 90 percent of acrylonitrile and from 2 to 50 percent of a modifying copolymer containing, in the molecule, from 10 to 70 percent of acrylonitrile and from 30 to 90 percent of a different mono-olefinic substance as exemplified above, exhibit increased heat-resistance which is especially pronounced as compared to the heat-resistance of fibers formed under the same conditions from a substantially homogeneous acrylonitrile copolymer having substantially the same overall composition as the blend and a molecular weight which is substantially the same as the molecular weight of the base polymer in the blend.

After the fibers are formed from the blends, by either dry or wet spinning processes, they are given a stretch of at least 200% under heating for orientation. This stretching is performed after the residual spinning solvent carried by the fibers has been reduced to not more than 25% by weight, and preferably to not more than 2% by weight. During the stretching, the fibers may be heated to from 100° C. to about 250° C. or higher. The fibers may be stretched while they are passing through a heated liquid such as water or other liquid inert to the resin, or while they are passing through a body of finely divided inert solid material such as talc. The fibers may also be heated in an atmosphere of hot air or steam, which may be dry, saturated or supersaturated.

In general, when the blend is such that the overall proportion of the component other than acrylonitrile in the modifying copolymer is 10 percent or less on the weight of the blend, the fibers produced from the blend and those produced from a substantially homogeneous copolymer having substantially the same overall composition, shrink to approximately the same extent when the two types of fibers are relaxed in boiling water. The difference between the fibers resides in that the fibers from the blend are characterized by markedly higher resistance to shrinkage when they are heated in a free-to-shrink condition, after relaxation in boiling water and drying, than are the control fibers comprising the copolymer.

When the shrinkage in boiling water is approximately the same, the difference between the fibers can be determined by subjecting them to heat in a free-to-shrink condition, and measuring the respective shrinkages in percent. Much higher temperatures are required to shrink the fibers formed from the blends, as will be apparent from the examples given below.

There are other instances where the shrinkage of the control copolymer fibers in boiling water is so excessive that, due to the resulting loss of orientation, and concomitant prohibitive loss of tenacity and increase in extensibility, the fibers are useless for general textile purposes. This is also apparent from certain of the examples given below, wherein the fibers from the blends are compared with such control fibers on the basis of their initial shrinkage in boiling water.

The fibers from the blend do not shrink excessively in the boiling water used for stabilizing them. Therefore, the tenacity and extensibility exhibited by those fibers after the heat-stretching for orientation are altered to only a comparatively slight extent by the boiling water stabilization.

In the foregoing discussion, and in certain of the examples, the heat-stability of the fibers from blends prepared in accordance with the invention is compared with the heat-stability of fibers formed from a copolymer having substantially the same overall composition as the blend. In certain instances, the fibers from the blend cannot be compared directly with fibers formed from a copolymer of the same composition. However, the heat-stability of the fibers from those last-mentioned blends is of the same order as that of the fibers formed from blends and contrasted to fibers formed from the copolymers.

In addition to exhibiting good or increased heat-stability, the blends and articles formed therefrom may exhibit other properties, such as dye-receptivity, water pick-up capacity, resistance to the propagation of flame, etc., which are different from the properties of the base polymer.

Polyacrylonitrile and copolymers of acrylonitrile with certain other vinyls such as vinyl acetate, styrene, acrylic and methacrylic acids, methacrylonitrile, the acrylates and methacrylates, etc. do not have sufficient dye affinity to enable their use in the production of satisfactory colored articles. It is possible by the present invention to simultaneously impart dye-receptivity to acrylonitrile polymers which are not, as such, receptive to dyestuffs, and to produce articles which are characterized by good heat resistance. This is accomplished by blending the base acrylonitrile polymer which is not dye-receptive with a modifying polymeric material which is dye-receptive.

The modifying polymeric material may be any polymeric composition containing nuclei reactive with or receptive to dyestuff, and which is soluble in dimethylacetamide as discussed above. For example, the modifying polymeric material may contain a free carboxyl group and impart receptivity for the basic dyestuffs to the blend, or it may contain a sulfone group and impart receptivity for the acetate or dispersol type dyestuffs to the blend, or it may contain basic tertiary nitrogen whereby the blend is rendered receptive to the acid dyestuffs.

In a preferred embodiment of this invention, the base polymer of from 90 to 100 percent by weight of acrylonitrile and from 0 to 10 percent of another, different mono-olefinic substance is blended with a modifying polymeric material containing basic tertiary nitrogen to obtain blends which are receptive to the acid dyestuffs.

The modifying polymeric material which is blended with the base polymer to produce blends which are receptive to the acid dyestuffs may be a copolymer containing, by weight in the molecule, from 30 to 90 percent of a vinyl-substituted heterocyclic tertiary amine, including any of the tertiary amines mentioned herein, and from 10 to 70 percent of acrylonitrile.

The modifying polymeric material may also be a polyamide obtained by condensing dinitriles or diamides with formaldehyde and having the structural formula:

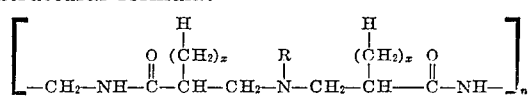

wherein the R group is an alkyl, cycloalkyl, or aralkyl radical having up to eight carbon atoms, $x$ is a small whole number from zero to one, inclusive, and $n$ is a whole number indicative of the extent of polymerization.

These polyamides are preferably prepared by reaction of formaldehyde with a specific class of azadinitriles, which are derived from acrylonitrile or methacrylonitrile by reaction with a half of a stoichiometric quantity of a suitable primary amine, selected to provide the desired substituent on the tertiary amino group. In accordance with this method a primary amine, for example methyl amine, n-butyl amine, benzyl amine, cyclohexyl amine, or any other alkyl, cycloalkyl or aralkyl amine having up to eight carbon atoms, is reacted with either two molecular equivalents of acrylonitrile or two molecular equivalents of methacrylonitrile to form a 3-azapimelonitrile or a corresponding 1,5 - dimethyl - 3 - azapimelonitrile. The dinitrile is then condensed with formaldehyde in the presence of an acid catalyst under substantially anhydrous conditions and then poured into an excess of water at low temperatures, or a water-ice mixture to form a salt of polymethyleneazapimelamide or the corresponding dimethyl substituted product from which the polymer may be precipitated by treatment with a base, for example sodium hydroxide.

Although the reaction between formaldehyde and the dinitrile is the most convenient method, the polyamides may also be prepared by reacting the diamides corresponding to the dinitriles with formaldehyde whereby the same products are prepared. The method of preparing the polyamides from the dinitriles does not form the corresponding diamide by hydrolysis, but is believed to form an intermediate addition product which breaks down upon contact with water to form the substituted polymethyleneazapimelamide.

The modifying polymeric material may also be a linear polyester containing either tertiary amino groups or quaternary ammonium radicals. Such polyesters may be obtained by the condensation of selected difunctional compounds containing carboxy and hydroxyl groups. By carboxy group is meant a carboxylic acid group or a group derived from a carboxylic acid, such as an ester, an acid chloride, or another derivative which will react with a hydroxyl group under the conditions existing in the condensation reaction medium. Suitable difunctional compounds are the dicarboxylic acids, the glycols, and the monohydroxy monocarboxylic acids, or reactive derivatives of these three types of difunctional compounds. A critical characteristic of the polyesters which are useful as modifying polymeric materials for the production of blends which are receptive to the acid dyestuffs is the presence of tertiary amino groups or quaternary ammonium radicals in one or more of the components used in the preparation of the polyesters.

Representative polyesters which may be used as the modifying polymeric material in preparing the blends of the invention are those obtained by the condensation of any dihydroxy compound with an acid of the formula:

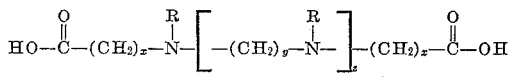

wherein $x$, $y$, and $z$ are small whole numbers, and R is an alkyl, aralkyl, or cycloalkyl radical, and preferably those wherein $z$ is zero to one inclusive and and $x$ and $y$ are one to two inclusive; or with an acid of the formula

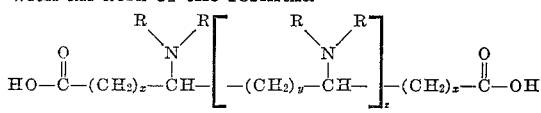

wherein $x$, $y$, and $z$ are small whole numbers, and R is alkyl, aralkyl, or cycloalkyl radicals, and preferably those wherein $x$ is a whole number from one to two, inclusive, $y$ is a whole number from two to six, inclusive, and $z$ is a whole number from zero to one, inclusive; or acids of the formula

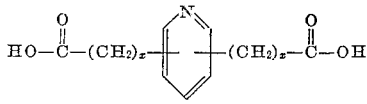

wherein $x$ is a small whole number from zero to three, inclusive.

The polyester may also be obtained by condensation of any dihydroxy compound with an aromatic acid containing the tertiary amino group on a side chain. Thus, phthalic acid may contain an aliphatic substituent on the ring containing a tertiary amino grouping.

All of the above-mentioned dicarboxylic acids containing reactive tertiary amino groups may be converted into quaternary ammonium compounds which may be condensed with dihydroxy compounds.

Suitable dihydroxy compounds for condensation with the various dicarboxylic acids or derivatives thereof described above are the aliphatic glycols, such as ethylene glycol, 1,2-propylene glycol, trimethylene glycol, tetramethylene glycol, the various other butylene glycols, the polyethylene glycols, such as diethylene glycol, triethylene glycol, and other oxaglycols and the analogous thioglycols having divalent sulfur atoms in place of the ether oxygen atoms, hexamethylene glycol, decamethylene glycol, and analogous compounds containing an aliphatic hydrocarbon, a thiohydrocarbon, or an oxahydrocarbon radical between the hydroxyl groups. Other glycols which may be used are those containing aromatic nuclei in the otherwise aliphatic chains, for example the various di(hydroxyalkyl) benzenes and the analogous compounds having other divalent aromatic nuclei in the chain between the hydroxyl groups.

Other polyesters which are useful for blending with the base polymer to impart receptivity for the acid dyes thereto are the polyesters which have their functional tertiary amino or quaternary ammonium radical in the glycol nucleus, for example, the polyesters derived from N-substituted aze glycols of the formula

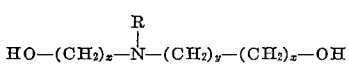

wherein $x$ and $y$ are small whole numbers, and R is an alkyl, a cycloalkyl, or an aralkyl radical, and preferably those wherein R has a maximum of eight carbon atoms, $x$ is from two to three, inclusive, and $y$ is from two to six, inclusive; glycols in which the tertiary amino group is present in a side chain and is not an atom in the continuous chain between the hydroxyl groups, that is, those glycols having the formula:

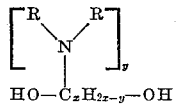

wherein $x$ is the number of carbon atoms in the aliphatic hydrocarbon portion of the molecule to which two hydroxyls and any number of tertiary amino radicals are attached, $y$ is the number of tertiary amino substituents in the compound, and R is alkyl, aralkyl, or cycloalkyl radical; glycols in which the tertiary amino group is substituted on an aromatic radical in which the tertiary amino group is present in a heterocyclic ring; and glycols reacted with halogen-containing organic compounds, such as alkyl, aralkyl, or cycloalkyl halides, halogen-substituted ethers, halo-alkyl esters of carboxylic acids, or alkyl esters of halo-substituted carboxylic acids, to form quaternary salts.

The functional glycols may be reacted with any dicarboxylic acid, or an ester, acid chloride, or salt thereof. Thus, derivatives of the following acids may be used effectively: succinic acid, adipic acid, suberic acid, sebacic acid, and other acids containing divalent aliphatic hydrocarbon radicals between the carboxy groups, the various aromatic dicarboxylic acids such as o-phthalic acid, isophthalic acid, terephthalic acid, diphenylene dicarboxylic acid, naphthalene dicarboxylic acids and other acids having an aromatic nucleus and two carboxy substituents. The other mixed aromatic aliphatic acids may be similarly used, for example carboxymethyl-benzoic acid, phenyl-substituted succinic acid and other dicarboxylic acids having araliphatic radicals with the carboxy groups substituted on either the aromatic or aliphatic portion of the araliphatic radical.

If desired, the polyesters which are blended with the base polymer containing at least 90 percent of acrylonitrile may have the functional tertiary amino or quaternary ammonium radical in both the dicarboxylic acid and the glycol.

Other types of polyesters which may be blended with the base polymer containing at least 90 percent of acrylonitrile are those prepared from hydroxy acids containing tertiary amino or quaternary ammonium radicals. These difunctional compounds may have the critical nitrogen group in the carbon chain between the hydroxyl and carboxy groups or it may be in an independent side chain. The tertiary amino or quaternary ammonium radical may be aliphatic in nature or it may be part of an alkyl substituent on an aromatic nucleus. Similarly, the functional nitrogen group may be part of a heterocyclic ring substituted in or on the chain between the hydroxyl and carboxy radicals. Suitable types of these hydroxy acids are those represented by the formulae:

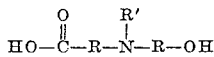

and

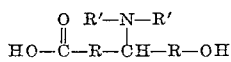

wherein the R radicals are divalent hydrocarbon radicals and the R' radicals are monovalent hydrocarbon radicals.

Other modifying polymeric materials containing basic nitrogen which may be blended with the base acrylonitrile polymer in accordance with the invention to produce useful blends having good heat stability and receptivity for the acid dyes are the quaternary ammonium polymers obtained by reacting polymers of vinyl-substituted heterocyclic tertiary amines with quaternizing agents. For example, the various isomeric vinylpyridines, such as 2-vinylpyridine, 3-vinylpyridine, and 4-vinylpyridine, or any of the other vinyl-substituted heterocyclic tertiary amines mentioned previously, are useful amines. The polymers of the vinyl-substituted hetero-nitrogen compounds may be converted to the corresponding quaternary ammonium compound by the addition of an organic compound containing a halogen atom. Alternatively, the monomers may be converted to the quaternary salt and subsequently polymerized.

Suitable compounds for effecting the conversion of amines or amine-containing polymers to the quaternary salts are the alkyl halides, the alkyl esters of halo-acetic acid, the halo-alkyl esters of the various carboxylic acids, the halo-substituted ethers, the halo-substituted ketones, or other stable organic compounds containing halogen substituents. As examples of useful quaternizing compounds the following may be mentioned: n-butyl bromide, ethyl chloride, octadecyl chloride, lauryl iodide, ethyl chloracetate, chlorethyl acetate, methyl chlorethyl ether, methyl chlormethyl ether, methyl chlorethyl ketone, chlorethyl benzoate, benzyl chloride, methyl-α-chloro-propionate, and homologues thereof. The most useful of these reactants are those of intermediate molecular size and are liquids of relatively low vapor pressure under normal conditions, for example butyl bromide, n-butyl chloride, isobutyl chloride, t-butyl chloride, and other organic halogen derivatives which are liquids at normal temperatures and pressures.

The various polymers containing a quaternary ammonium or tertiary amino group defined in the preceding paragraphs may be prepared in the presence of other active mono-olefinic compounds to obtain copolymers. Monomers which may be copolymerized with the tertiary amine are, for example, styrene, α-methylstyrene, vinyl chloride, vinylidene chloride, vinyl acetate, acrylonitrile, methacrylonitrile, acrylic acid, methacrylic acid maleic anhydride, the alkyl acrylate, the alkyl methacrylates, vinyl ethers, alkyl crotonates, the alkyl maleates, and the alkyl fumarates. The copolymers are reacted with the halogen compounds to form the quaternary ammonium salts, and these copolymers containing the quaternary ammonium group may be used as the modifying polymeric materials in the blends of the invention.

Another group of polymeric materials which may be blended with the base polymer containing at least 90 percent of acrylonitrile to obtain heat-resistant, dyeable blends, are the polyamides obtainable by reacting an alkylene diamine with an unsaturated acid or acid ester. For example, suitable polyamides may be obtained by the condensation of alkylene diamines, such as ethylene diamine, trimethylene diamine, tetramethylene diamine, and other diamines having from two to six carbon atoms in the aliphatic hydrocarbon chain, and including the unsymmetrical diamines, with unsaturated acids such as acrylic acid, methacrylic acid, or crotonic acid, or derivatives thereof, and particularly the lower alkyl esters, for example, those of which the alcohols boil at temperatures below 250° C., and especially those having from one to five carbon atoms.

Still another class of polymeric materials which may be blended with the base acrylonitrile polymer to produce dyeable blends in accordance with the invention are copolymers of acrylonitrile with vinylpyridines or the alkyl-substituted vinylpyridines which have been quaternized by reaction with alkyl esters of oxygen-containing sulfur acids, or copolymers of acrylonitrile with vinylpyridines which have been reacted, prior to the copolymerization, with the alkyl esters of oxygen-containing sulfur acids. The useful esters of oxygen-containing sulfur acids are those having ionization constants greater than $10^{-4}$, for example, sulfuric acid, sulfurous acid, toluene sulfonic acid, benzene sulfonic acid, and other alkyl, aryl, aralkyl and alkaryl sulfonic acids.

Polymers of the vinyl-substituted heterocyclic tertiary amine, and particularly polyvinylpyridine, may also be blended with the base acrylonitrile polymer to produce the new, dyeable compositions of the invention.

Instead of the polymeric materials mentioned above, the modifying polymeric material which is blended with the base polymer containing at least 90 percent of acrylonitrile by weight in the molecule, may be a copolymer of acrylonitrile with a copolymerizable ester, such as a vinyl, allyl, or methallyl ester of α-halocarboxylic acid which copolymer has been trated with thiourea. The esters which may be copolymerized with the acrylonitrile by the polymerization procedures mentioned herein are those having the structural formula

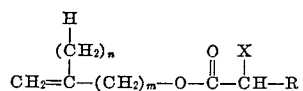

wherein X is a halogen atom of the group consisting of chlorine and bromine, R is a radical of the group consisting of hydrogen and alkyl radicals having up to four carbon atoms, $m$ and $n$ are each whole numbers from zero to one, inclusive, and $n$ is not greater than $m$.

These copolymers are rendered dye-receptive by reaction with a thiourea. A wide variety of the thioureas may be used, including unsubstituted thioureas and substituted thioureas having the structural formula:

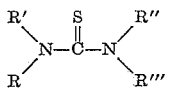

wherein R, R', R'', and R''' may be alkyl, aryl, aralkyl, alkaryl, cycloalkyl, and alkenyl radicals.

The copolymers may be treated with the selected thiourea directly or with solutions thereof in water or other liquid media in which it is soluble. For example, the thiourea may be dissolved in the solvent at any suitable temperature up to 150° C., and the finely ground copolymer of acrylonitrile and the ester of the α-halocarboxylic acid dispersed in the solution. Alternatively, both the selected thiourea and the copolymer may be dissolved in a mutual solvent in which the interaction and modification of the copolymer take place. The thiourea- or substituted-thiourea-modified copolymer may then be blended with the base acrylonitrile polymer, in accordance with the present invention.

Another class of polymeric materials which may be blended with the base acrylonitrile polymer are the non-fiber forming copolymers of acrylonitrile with vinyl, allyl, or methallyl esters of halo-substituted acetic acids having the formula

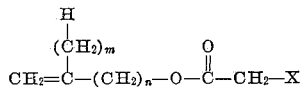

wherein X is a halogen atom, $n$ and $m$ are small whole numbers from zero to one, inclusive, and $n$ must be as great as $m$. Alternatively, there may be used, as the modifying polymeric material, copolymers of acrylonitrile with vinyl, allyl, or methallyl esters containing quaternary ammonium groups, and obtained by copolymerizing acrylonitrile with esters containing quaternary salt substituents, or by copolymerizing acrylonitrile with the esters of the halogen-substituted acids and then reacting the copolymers with an amine or with ammonia to form substituted ammonium groups in situ in the copolymer.

For example, the ester of the halo-acetic acid, such as vinyl-chloracetate may be reacted with a tertiary amine, such as trimethylamine or triethylamine, and the quaternary ammonium derivative thus obtained, for example (carbovinyloxymethyl) trimethylammonium chloride, may be copolymerized with acrylonitrile by any of the procedures mentioned herein, to obtain a copolymer which is blended with the acrlyonitrile base polymer. Or the modifying copolymer may be prepared by copolymerizing acrylonitrile with the ester of the haloacetic acid, for instance with vinylchloracetate and the copolymer subsequently treated, in solid granular form, or in solution, in N,N-dimethylacetamide or other suitable solvent, with ammonia, or with a primary, secondary, or tertiary amine.

In order to retain the desirable properties of the base polymer containing at least 90 percent of acrylonitrile, in the blend, the modifying polymeric material cannot be used in a proportion greater than 50 percent on the weight of the blend. Preferably, the modifying polymeric material is used in a proportion considerably less than 50 percent. The modifying polymeric material, and the proportion thereof blended with the base polymer, will depend on the properties, in addition to heat-stability, desired for the blend. A modifying polymeric material is selected which yields the desired blend when it is used in a proportion of from 2 to not more than 50 percent by weight.

When the base polymer is blended with a modifying polymeric material containing nuclei reactive with dyestuff, the overall proportion of the component containing such nuclei is from 2 to 30 percent by weight. All of the component containing the dye-reactive or receptive nuclei in the blend may be contributed by the modifying polymeric material, or a portion thereof may be present in the base polymer molecule.

Presently preferred compositions in accordance with the invention are the dyeable blends comprising the base polymer and polyvinylpyridine or a copolymer containing, by weight in molecule, from 30 to 90 percent of a vinylpyridine, and from 10 to 70 percent of acrylonitrile, which blends have an overall polymerized vinylpyridine content of from 2 to 30 percent by weight.

In one specific embodiment, the invention contemplates the production of a pair of stock polymers, a base polymer containing at least 90 percent of acrylonitrile by weight in the molecule, and a modifying copolymer containing, by weight in the molecule, from 10 to 70 percent of acrylonitrile and from 30 to 90 percent of a substance other than acrylonitrile, and particularly a substance containing tertiary amino or quaternary ammonium groups, or of a small number of pairs of base polymers and modifying copolymers, and the blending of the two types in varying proportions to obtain compositions suitable for fabricating into fibers, films, sheets or other shaped articles having high heat-resistance and, in some instances, receptivity for the acid wool dyes or for acetate dyestuffs.

As an illustration, a stock base polymer, containing from 90 to 100 percent acrylonitrile and from 0 to 10 of another, monolefinic copolymerizable substance, such as a copolymer of acrylonitrile and vinyl acetate, and a stock modifying copolymer containing, in the polymer molecule, 30 percent of acrylonitrile and 70 percent of a vinyl-substituted heterocyclic tertiary amine such as a vinylpyridine, and particularly 2-vinylpyridine, may be prepared and the two blended in varying proportions to obtain final blended compositions having an overall polymerized vinylpyridine content of from 2 to 30 percent.

Instead of fibers, other shaped articles may be formed from the blends, such as films, rods, tubes, casings, and so on.

The base polymer and the modifying polymeric material are preferably blended by intimately mixing them with a common solvent with stirring, to obtain a solution of the blend which can be spun, cast, or otherwise formed into a shaped article. As previously stated, the modifying polymeric material is soluble in dimethylacetamide, and in blends with the base polymer, forms a solution in dimethylacetamide, which can be formed into fibers by conventional procedures. The blends may be prepared by forming an intimate mixture of the base polymer and modifying polymeric material in dimethylacetamide. However, the characteristic solubility of the modifying polymeric material in dimethylacetamide does not preclude the use of other solvents in which the blend of the base polymer and modifying polymeric material forms a solution which can be formed into fibers in preparing the blends or in preparing spinning or casting solutions thereof. Other suitable solvents in which the blend of the base polymer and modifying polymeric material forms a solution which can be formed into a fiber may be used. Examples of these are N,N-dimethylformamide, butyrolactone, ethylene carbonate, and N,N-dimethylmethoxyacetamide. However, one of the advantages of the blends of the invention resides in their property of forming spinnable solutions in dimethylacetamide, a solvent which is especially useful in the large scale production of fibers.

The blends may also be prepared by mixing the solid polymeric materials in conventional mechanical mixers, such as Banbury type mixers, roll mills, or dough mixers, in the presence of the solvent or of a plasticizer, or they may be mixed dry and then dissolved in the selected solvent.

In dry spinning the solution of the blend may be extruded into any suitable evaporative medium for the selected spinning solvent.

Examples of suitable coagulating baths for wet-spinning the blends include mixtures of the spinning solvent and water, such as mixtures of dimethylacetamide and water, or mixtures of dimethylformamide and water, isopropanol, glycerol, mixtures of predominantly aromatic hydrocarbons such as that commercially available under the trade designation Solvesso-100, etc.

Further details of the practice of the invention are set forth in the following examples.

*Example I*

A substantially homogeneous copolymer of acrylonitrile and 2-vinylpyridine was prepared as follows:

3000 parts of water were saturated with a mixture of 103 parts of acrylonitrile and 23 parts of 2-vinylpyridine. The solution was heated to reflux (80° C.) and 9.0 parts of potassium persulfate were added. As soon as polymerization began, the addition of a mixture of 146 parts of acrylonitrile and 179 parts of 2-vinylpyridine was begun. The mixture was added continuously at a controlled rate such that the temperature and rate of reflux remained substantially constant, indicating a substantially constant concentration of the monomers in the reactor in substantially the proportion in which they were being accepted into the copolymer. The reaction was stopped when the addition was complete by filtering the copolymer. On analysis it was found to contain 57.4 percent of 2-vinylpyridine and 42.6 percent of acrylonitrile.

Polyacrylonitrile was prepared by polymerizing 500 parts of acrylonitrile in 3000 parts of water, in the presence of ten parts of potassium persulfate at 80–82° C. The homopolymer had a specific viscosity of 0.56 at 0.2 gm. concentration in 100 cc. of dimethylformamide.

83.9 parts of the polyacrylonitrile (base polymer) were blended with 16.1 parts of the copolymer containing 57.4 percent of 2-vinylpyridine and 42.6 percent of acrylonitrile (modifying copolymer) to produce a composition having an overall polymerized 2-vinylpyridine content of 9.2 percent on the weight of the blend, the balance being acrylonitrile. The blend was prepared by dissolving the base polymer and the modifying copolymer in dimethylformamide to produce a 15 percent spinning solution.

The solution was spun through a spinneret having 44 holes each 4 mils in diameter into a coagulating bath comprising Solvesso-100 (a commercial mixture of high boiling predominantly aromatic hydrocarbons) at 25–35° C. After a 26 inch immersion the filaments were withdrawn, stretched 200%, washed in isopropanol, then in water for about 12 hours, and dried. They were stretched 300% at 185° C. in air, relaxed in boiling water and dried. The oriented fibers were then heated in a relaxed free-to-shrink condition to determine their heat-resistance, and the shrinkage was compared with that of fibers produced under the same conditions from a substantially homogeneous copolymer of acrylonitrile and 2-vinylpyridine containing 8 percent of 2-vinylpyridine in the molecule, and having a specific viscosity substantially the same as the polyacrylonitrile in the blend. The results are shown in the following table.

|  | Percent Shrinkage | | |
|---|---|---|---|
|  | 10% | 15% | 20% |
|  | ° C. | ° C. | ° C. |
| Fibers from the blend | 255 | 280 | 296 |
| Fibers from the copolymer | 208 | 219 | 228 |

The fibers from this blend were dyed in a dyebath prepared by dissolving 5% Glaubers salt, 3% sulfuric acid (96%) and 2% of the acid wool dye Wool Fast Scarlet G Supra (percentages on the weight of the fibers to be dyed), in water. The fibers were entered into the bath at 55° C., the bath was brought to the boil in 10 minutes and boiled for 20 minutes. The fibers were dyed to a deep, red shade.

*Example II*

51.6 parts by weight of the base polymer of Example I were blended with 48.4 parts of the modifying copolymer containing 57.4 percent of 2-vinylpyridine and 42.6 percent of acrylonitrile, to obtain a blend having an overall polymerized 2-vinylpyridine content of 27.8 percent, on the weight of the blend. The blend was obtained by dissolving the polyacrylonitrile and modifying copolymer in dimethylformamide to obtain a 15 percent spinning solution. Fibers were formed from the blend as in Example I. The heat-stretched fibers were relaxed in boiling water in which they shrank 26%.

Fibers produced in a similar manner from a substantially homogeneous copolymer containing 25.4 percent of 2-vinylpyridine and the balance acrylonitrile, in the molecule, were also relaxed in boiling water. These fibers of the copolymer shrank 70 percent, and were useless for general textile purposes.

*Example III*

59.6 parts of the base polymer of Example I were blended with 40.4 parts of the modifying copolymer, as in Example I, to produce a blend having an overall polymerized 2-vinylpyridine content of 23.2 percent. Fibers produced from the dimethylformamide solution under the conditions of Example I were tested for heat-resistance, and their heat-resistance was compared with that of a copolymer containing 21.4 percent 2-vinyl-pyridine in the molecule, the balance acrylonitrile. The fibers produced from the blend shrank 23 percent when they were relaxed in boiling water. The fibers from the copolymer of the same overall composition shrank 60 percent, when they were relaxed in boiling water.

*Example IV*

67.7 parts of the base polymer of Example I were blended with 32.3 parts of the modifying copolymer, as in Example I, to produce a blend having an overall polymerized 2-vinylpyridine content of 18.5 percent. Fibers produced from the dimethylformamide solution under the conditions of Example I were tested for heat-resistance by heating them in free-to-shrink condition, after they had been relaxed in boiling water and dried. The blend fibers shrank 18 percent in the boiling water. This compared to a shrinkage of 40 percent in boiling water for fibers formed from a copolymer having essentially the same overall composition. The temperatures required to shrink both types of fibers 10, 15, and 20% after the preliminary stabilization in boiling water were determined. The results are shown in the following table:

|  | Percent Shrinkage | | |
| --- | --- | --- | --- |
|  | 10% | 15% | 20% |
|  | °C. | °C. | °C. |
| Fibers from the blend | 220 | 270 | 294 |
| Fibers from the copolymer | 190 | 195 | 203 |

*Example V*

A blend of polyacrylonitrile and an acrylonitrile-styrene copolymer was prepared as follows:

To 3500 parts of water containing 11.6 parts of potassium persulfate there was added, at 70° C., over 55 minutes, a mixture of 94 parts of styrene and 47.8 parts of acrylonitrile to produce a copolymer of 30 percent acrylonitrile and 70% styrene. When the copolymer had been produced, 431 parts of acrylonitrile only were added over two hours. When all of the acrylonitrile had been added, the reaction was stopped by filtering the mixture of polyacrylonitrile and the copolymer of acrylonitrile and styrene. The overall polymerized styrene content of the mixture, by nitrogen analysis, was 21 percent. The blend had a specific viscosity of 0.44 (in 0.2 gm./100 ml. dimethylformamide).

A 17% solution of the mixture in dimethylformamide was prepared. Fibers were formed from the solution under the conditions of Example I. The fibers shrank 15% when they were relaxed in boiling water. This compared with a shrinkage of 60% for fibers formed from a substantially homogeneous copolymer of acrylonitrile and styrene containing 20 percent of styrene in the molecule. The orientation was practically entirely removed from the fibers of the copolymer, as a result of the excessive shrinkage of those fibers in the boiling water. Also, as a result of this severe shrinkage, the tenacity of the heat-stretched copolymer fibers was reduced from 4.46 gms./denier to 1.2 gms./denier, and the extensibility was increased from 8.1 to 75%. The copolymer fibers were not suitable for general textile purposes.

*Example VI*

A copolymer of 57 percent of styrene and 43 percent of acrylonitrile was prepared as follows:

To 700 parts of water, there was added a mixture of 8.2 parts of acrylonitrile and 1.8 part of styrene. The temperature of the saturated solution was brought to reflux (90° C.) and 1.2 parts of potassium persulfate were added. As soon as copolymerization set in, a mixture of 21.5 parts of acrylonitrile and 28.5 parts of styrene was added continuously at a rate to maintain the temperature and rate of reflux substantially constant. The addition required 35 minutes. As soon as the addition was completed, sodium chloride was added to coagulate the copolymer, which was then washed with water. By analysis, the copolymer was found to contain 57.2 percent of styrene and 42.8 percent of acrylonitrile. It had a specific viscosity of 0.21 (0.2 gms./100 ml. of dimethylformamide).

A copolymer containing 97 percent acrylonitrile and 3 percent of vinyl acetate, in the molecule, was prepared by adding a mixture of 97 parts of acrylonitrile and 3 parts of vinyl acetate to a reactor containing 2000 parts of distilled water, 1 part of sulfonated mahogany soap and one part of potassium persulfate, continuously at a controlled rate which permitted maintenance of the reaction temperature at 80° C.±0.5° C. The reaction was completed in 1.75 hours and the unreacted monomers were removed by steam distillation at 100° C. The copolymer had a specific viscosity of 0.32 (in 0.2 gm./100 ml. dimethylformamide). 83.7 parts of the copolymer containing 97 percent acrylonitrile and 3 percent vinyl acetate (base polymer) were blended with 45 parts of the copolymer containing 57.2 parts of styrene and 42.8 parts of acrylonitrile (modifying copolymer) to obtain a blend having an overall polymerized styrene content of 20 percent, on the weight of the blend. The blend was obtained by dissolving the copolymers in dimethylacetamide to obtain a 17% solution.

The solution was spun through a spinneret having 40 holes each .035 inches in diameter, into isopropanol at 25° C. Spinning pump speed: 9 ml./min. After an immersion of 8 inches, the fibers were withdrawn. They were taken up on a godet at a rate of 20 ft./minute and stretched 250%, washed with water at 50° C., air dried, and stretched 500% in an atmosphere of dry steam under 55 lbs./sq. in. pressure, in the usual manner, i. e., by passing them from one thread handling device to another, through a steam stretching tube. The fibers shrank 9% when they were relaxed in boiling water. The shrinkage of 9 percent in boiling water for the blend fibers compared with a shrinkage of 60 percent in boiling water for the fibers comprising a substantially homogeneous copolymer of acrylonitrile and styrene containing 20 percent of styrene, in the molecule:

*Example VII*

A blend of a copolymer of acrylonitrile and styrene with polyacrylonitrile was prepared as follows:

To 300 parts of water there was added a mixture of 50.6 parts of acrylonitrile and 1.4 parts of styrene. The saturated solution was heated to refluxing (79° C.) and 10.4 parts of potassium persulfate were added. As soon as copolymerization set in, the addition of a mixture of 131 parts of acrylonitrile and 79 parts of styrene was begun. The mixture was added continuously at a controlled rate to maintain the temperature and rate of reflux substantially constant. The addition required 9 minutes. A substantially homogeneous copolymer containing 38 percent of styrene and 62 percent of acrylonitrile was produced. After the copolymer was obtained the continuous addition of 266 parts of acrylonitrile only was begun, and continued for 11 minutes at a rate to maintain the temperature and rate of reflux substantially constant. As soon as the addition was completed, the reaction was stopped by filtering the blend. By analysis, the blend of copolymer and homopolymer was found to contain 78.8% of acrylonitrile. The overall polymerized styrene content of the blend was 21.2 percent by weight. The blend had a specific viscosity of 0.64 (0.2 gm./100 ml. dimethylformamide). A 12 percent solution of the blend in dimethylformamide was prepared. It was spun through a spinneret having 24 holes, each 0.025 inches in diameter, into a 50–50 mixture of Sinclair Solvent and Solvesso-100 (commercial mixtures of high boiling predominantly aromatic hydrocarbons). Pump speed: 2.7 ml./min. After one-half inch immersion in the bath at 60° C. and a 25 inch immersion at 25° C., the fibers were withdrawn. They were taken up on a godet at a rate of 17 ft./min. and stretched 200%, washed in isopropanol, and then in water. After drying and stretching 400 percent at 170° C., the blend fibers had a tenacity of 4.9 gms./denier; extensibility, 7.2%. The final blend fibers shrank 20 percent when relaxed in boiling water. As previously noted, (Example V) the heat-stretched fibers comprising a substantially homogeneous copolymer containing 80 percent of acrylonitrile and 20 percent of styrene, in the molecule shrank 60 percent when they were relaxed in the boiling water and lost orientation to a prohibitive extent.

*Example VIII*

To 1000 parts of water there was added a mixture of 75 parts of acrylonitrile and 25 parts of 2-vinylpyridine. The solution was brought to reflux at 75° C., and 5 parts of potassium persulfate were added. A mixture consisting of 125 parts of acrylonitrile and 125 parts of 2-vinylpyridine was added continuously at a rate controlled to maintain the rate and temperature of reflux substantially constant. Ice was added to stop the reaction and the copolymer was separated by freezing. On analysis, it was found to contain, in the molecule, 50 percent of acrylonitrile and 50 percent of 2-vinylpyridine.

A substantially homogeneous copolymer containing, in the molecule, 97 percent acrylonitrile and 3 percent vinyl acetate was prepared by the method of Example VI.

84 parts of the base polymer containing 97 percent acrylonitrile and 3 percent of vinyl acetate were blended with 16 parts of the modifying copolymer containing 50 percent of acrylonitrile and 50 percent of 2-vinylpyridine, to obtain a blend having an overall polymerized 2-vinylpyridine content of 8 percent. The polymers were blended by dissolving them in dimethylacetamide to obtain an 18 percent solution.

The dimethylacetamide solution was spun into fibers as in Example VI.

After relaxing the fibers in boiling water (9% shrinkage), and drying them, the fibers were heated to determine their heat resistance, and compared with fibers produced under like conditions from a copolymer containing 92 percent of acrylonitrile and 8 percent of 2-vinylpyridine in the molecule. The results are shown in the following table:

|  | Percent Shrinkage | | |
| --- | --- | --- | --- |
|  | 10% | 15% | 20% |
|  | ° C. | ° C. | ° C. |
| Fibers from the blend | 255 | 273 | 287 |
| Fibers from the copolymer | 208 | 219 | 228 |

*Example IX*

A mixture of 5400 grams of distilled water and 3.0 grams of Acto 450 (sulfonated stillbottoms) was heated to 84° C. A mixture of 2970 grams of acrylonitrile, 30 grams of vinyl acetate, and 12 grams of thioglycolic acid was added continuously at a relatively constant rate for two hours. During this period, a solution of 30.0 grams of potassium persulfate in 600 ml. of distilled water was added in 25 ml. increments every five minutes. The temperature fell from 84° C. to 72° C., where it remained for one hour. The temperature rose slowly to 80° C. by the end of the addition period. The vapor temperature was 70–72° C.

Upon completion of the addition, reflux was maintained for one-half hour with the temperature rising from 80° C. to 91° C., and the vapor temperature rising from 70° C. to 80° C. Unpolymerized monomers were then distilled from the slurry and the slurry was cooled, filtered on a vacuum filter, and washed with about 3 grams of distilled water per gram of dry solids. The solids were then dried in a circulating air oven at 75° C. for 16 hours. On analysis, the copolymer was found to contain 99 percent of acrylonitrile and one percent of vinyl acetate. It had a specific viscosity of 0.18 in a concentration of 0.1 percent in dimethylformamide.

A modifying copolymer was prepared as follows:

A solution of 60 grams of Aerosol O T and 4500 grams of distilled water was brought to reflux. A mixture of 1390 grams of 2-vinylpyridine and 710 grams of acrylonitrile was added continuously over a period of two hours. At the start of the addition, 200 ml. of a solution of 10 grams of potassium persulfate and 10 grams of sodium bicarbonate in 1000 grams of distilled water were added to the reactor. During the mixed monomer addition, 100 ml. increments of the said solution were added at fifteen minute intervals. Mild reflux was maintained by heating. When the additions were complete, reflux was maintained for one-half hour. Unpolymerized monomers were then removed by distillation.

The resulting emulsion was coagulated by freezing and thawing. The solids were filtered, washed, and dried in a vacuum oven at 65° C. for 40 hours. On analysis, the copolymer was found to contain 70 percent of 2-vinylpyridine and 30 percent of acrylonitrile. It had a specific viscosity of 0.11 in a concentration of 0.1 percent in dimethylformamide.

91.5 parts of the base polymer of 99 percent acrylonitrile, 1 percent vinyl acetate, and 8.5 parts of the modifying copolymer of 70 percent 2-vinylpyridine, 30 percent acrylonitrile were blended in dimethylacetamide to obtain a blend having an overall polymerized 2-vinylpyridine content of 6 percent, on the weight of the blended polymers.

Fibers formed from the solution of the blend by the method of Example I were relaxed in boiling water. They were then heated in a free-to-shrink condition and the shrinkage determined. The results are set forth in the following table, which also shows the shrinkage temperatures for fibers from a substantially homogeneous copolymer containing 94 percent acrylonitrile, 6 percent 2-vinylpyridine, in the molecule, which had been previously relaxed in boiling water.

|  | Percent Shrinkage | | |
|---|---|---|---|
|  | 10% | 15% | 20% |
|  | °C. | °C. | °C. |
| Fibers from the blend | 262 | 288 | 300 |
| Fibers from the copolymer | 226 | 240 | 250 |

Example X

A 2-liter flask was charged with 102.5 grams of 4-cyclohexyl-4-azapimelonitrile, 15.4 grams of trioxane and a mixture of formic and sulfuric acids. The temperature rose to 90° C. during the reaction and after cooling was poured into water to precipitate a polymeric substance identified as polymethylene-N-4-cyclohexyl-4-azapimelamide.

A fiber spinning solution was prepared by uniformly dispersing 18 parts by weight of a copolymer of 95 percent acrylonitrile and five percent vinyl acetate, two parts of the polyamide prepared as above and 80 parts of N,N-dimethylacetamide. After a uniform viscous solution had been prepared it was extruded through a spinneret containing thirty apertures each 0.005 inches in diameter, into a mixture of two parts of N,N-dimethylacetamide and one part of water. The spin bath extracted the solvent from the solution and precipitated the polymer as a multi-filament strand. Stretching the fiber 350 percent in a steam atmosphere produced a strong elastic fiber which had good resistance to shrinkage in boiling water.

The fiber so prepared and a control fiber of an unmodified copolymer of 95 percent acrylonitrile and five percent vinyl acetate, were each dyed by a standard procedure, involving the use of one cc. of a two percent aqueous solution of an acid dyestuff, Wool Fast Scarlet G Supra, five ccs. of three percent sulfuric acid and 40 ccs. of water for each gram of fiber to be dyed. The fiber from the blend gave an excellent color and almost complete dye bath exhaustion in one hour at 100° C. The unmodified fiber absorbed a maximum of twelve percent of the dye from the dye bath under identical conditions.

Example XI

A polyester was prepared by mixing approximately stoichiometric proportions of adipic acid and methyldiethanolamine and heating the mixture at 175° C. for 60 hours in a stream of dry nitrogen. A spinning solution was prepared by intimately mixing two parts by weight of the polyester with eighteen parts of a copolymer of 95 percent acrylonitrile and five percent vinyl acetate and 80 parts of dimethylacetamide. The mixture was stirred and warmed to a maximum of 60° C. until a homogeneous solution was obtained. Fibers were prepared by extruding the solution from a spinneret containing thirty apertures each 0.005 inch in diameter. The fiber was extruded into a mixture of approximately two parts of dimethylacetamide and one part of water, which extracted the polymer solvent and precipitated the polymer as a continuous multi-filament strand. The fiber was conditioned by stretching 350 percent, and had good resistance to shrinkage in boiling water.

The fiber prepared in accordance with the preceding paragraph and a fiber prepared from the copolymers of 95 percent acrylonitrile and five percent vinyl acetate, were each dyed in a dyebath as described in Example X. The fiber prepared in accordance with this example absorbed 99 percent of the dye from the dye bath in 60 minutes at 100° C., whereas under the same conditions the unmodified copolymer absorbed only twelve percent of the dyestuff. The fiber of the modified polymer developed a bright red color, whereas the fiber of the unmodified polymer was an unsatisfactory pale color.

Example XII

A copolymer of 50 parts by weight of acrylonitrile and 50 parts of vinylpyridine was prepared by adding the pre-mixed monomers gradually to an aqueous emulsion maintained at a temperature of 80° C. The emulsion contained as a dispersing agent two parts of a sodium salt of di-2-ethylhexyl ester of sulfosuccinic acid and 0.5 parts of potassium persulfate as a catalyst added in increments throughout a two hour reaction period. After the reaction was complete 2.2 parts of unreacted monomers were removed by steam distillation and the polymer separated from the emulsion by filtration after coagulation by freezing. The copolymer was dissolved in nitromethane and a stoichiometric quantity of n-butyl bromide added thereto. The solution was agitated at 60° C. for twenty-four hours. The quaternary salt of the polymer was then precipitated by pouring the nitromethane solution into an excess of water and then separated by filtration.

The fiber spinning solution was prepared by intimately mixing 85 parts by weight of N,N-dimethylacetamide, 13.5 parts of a copolymer of 95 percent acrylonitrile and five percent vinyl acetate, and 1.5 parts of the quaternary salt of vinyl pyridine-acrylonitrile copolymer described in the preceding paragraph. The solution was then extruded through a spinneret having thirty apertures each 0.005 inches in diameter into a mixture of 67 percent water and 33 percent N,N-dimethylacetamide. The fiber thereby produced was stretched 350 percent.

The fiber prepared in accordance with this example exhausted a dyebath as described in Example X in one hour, whereas comparable fibers prepared from copolymers of 95 percent acrylonitrile and five percent vinyl acetate without the addition of the quaternary salt of the vinylpyridine copolymer absorbed a maximum of twelve percent of the dyestuff in the bath.

Example XIII

One mole of methyl acrylate was dissolved in an approximately equal volume of toluene. While maintaining the temperature between 40 and 50° C., 0.85 mole of ethylene diamine was added thereto dropwise. After the reaction mass had stood at room temperature for about four hours, the solution was heated under a Vigreaux column and a mixture of methanol and toluene was removed until approximately the theoretical amount of methanol had been separated. The reaction mixture was heated at 175° C., at a pressure of one to two mls., for a twenty-four hour period. A substantial yield of a viscous polyamide was thereby obtained.

A spinning solution was prepared by intimately mixing 80 parts of dimethylacetamide, 18 parts of a copolymer of 95 percent acrylonitrile and five percent vinyl acetate, and two parts of the polyamide. The mixture was stirred at a temperature of 80° C. for one hour. The solution was then extruded through a spinneret containing 30 apertures each 0.005 inch in diameter into a mixture of two parts of N,N-dimethylacetamide and one part of water. The fibers thereby prepared were stretched 350 percent to form fibers of good strength and elasticity and good resistance to shrinkage in boiling water.

The fiber so prepared and a fiber of a copolymer of 95 percent acrylonitrile and five percent vinyl acetate, prepared by the identical procedure, were each dyed in a dye bath as described in Example X. The fiber prepared from the modified copolymer absorbed 92 percent of the dye from the dye bath in one hour at reflux temperature. A similar treatment of the unmodified copolymer resulted in the removal of only twelve percent of the dye.

*Example XIV*

A mixture of 637.5 grams of N,N-dimethylacetamide and 7.9 grams of methyl p-toluenesulfonate was prepared and 103.5 grams of a finely divided copolymer of 95 percent acrylonitrile and five percent vinyl acetate and 9.0 grams of a finely divided copolymer of 50 percent acrylonitrile and 50 percent vinylpyridine were added thereto and the mixture stirred for one hour at 80° C. A clear homogeneous solution resulted. The temperature was then lowered to 65° C. which was maintained for twelve hours to complete the quaternization reaction.

The solution was then extruded through a spinneret having 30 apertures each 0.05 inches in diameter. The fibers were extruded into a spin bath comprised of 60 parts of N,N-dimethylacetamide and 40 parts of water. The fibers were stretched 600 percent, washed and dried.

The fibers were found to have good resistance to shrinkage in boiling water and to exhaust a dye bath comprised of 1 ml. of a two percent aqueous solution of Wool Scarlet G Supra dye, 5cc. of three percent sulfuric acid, and 40 cc. of water for each gram of fiber being dyed.

*Example XV*

A mixture of 150 grams of styrene and 150 grams of 2-vinylpyridine was added gradually, over a period of 2 and ½ hours, to a medium consisting of 700 ccs. of water and 6 gms. of Ivory Snow, at reflux temperature. A 30 ml. portion of a catalyst solution (prepared by dissolving 4 gms. of potassium persulfate and 4 gms. of sodium bicarbonate in 400 ccs. of water), was added at the beginning of the reaction and a 15 ml. increment thereof was added every 15 minutes throughout the course of the reaction. After all reagents had been combined, the reaction mixture was steam distilled and 1.5 gms. of monomer recovered. A copolymer containing 50 percent of styrene and 50 percent of 2-vinylpyridine was obtained in a yield of 99.5 percent.

This copolymer was blended with a base polymer containing 95 percent of acrylonitrile and 5 percent vinyl acetate, in dimethylacetamide, to obtain a 15 percent solution of the blend. The overall polymerized 2-vinylpyridine content of the blend was 8 percent.

The solution of the blend was spun through a spinneret having 10 orifices each 0.005 inch in diameter. A 2-bath system was used, the first bath comprising a mixture of 60 percent dimethylacetamide and 40 percent water, and the second bath consisting of water. The fibers thus formed were continuously stretched 350 percent in a steam atmosphere. They showed good resistance to shrinkage in boiling water, and exhausted a dyebath as in Example X.

*Example XVI*

A copolymer of 50 percent methacrylonitrile and 50 percent of 2-vinylpyridine was prepared from a mixture of 150 gms. of methacrylonitrile and 150 gms. of 2-vinylpyridine by the procedure of Example XV.

About 16 parts of the methacrylonitrile-2-vinylpyridine copolymer was blended with about 84 parts of a copolymer containing 95 percent of acrylonitrile and 5 percent of vinyl acetate, to obtain a 15 percent solution of the blend. The overall polymerized 2-vinylpyridine content of the blend was 8 percent.

Fibers prepared from the solution, as in Example XV, were found to possess good resistance to shrinkage in boiling water. The fibers exhausted a dyebath prepared as described in Example X.

*Example XVII*

A mixture of 1200 cc. of 2-vinylpyridine and 200 cc. of water was placed in a vessel and steam was passed through the mixture until 700 cc. of non-aqueous material had been collected. The material was then separated from the aqueous layer and vacuum distilled. The purified vinylpyridine was mixed with 0.1 percent by weight of azo-2,2'-diisobutyronitrile. The mixture was heated at 60° C. for 100 hours. The resulting polymer was dissolved in pyridine and precipitated by the addition of a large excess of water, after which it was washed with water and dried to constant weight. It was found to have a specific viscosity of 0.33 in 0.1 percent concentration in N,N-dimethylformamide.

Polyvinylpyridine prepared as described above was blended in N,N-dimethylformamide, with a base copolymer containing 95 percent of acrylonitrile and 5 percent of vinyl acetate, to produce a solution of a blend having an overall polymerized 2-vinyl pyridine content of 8 percent. The solution was cast to films which were dyed in a bath as described in Example X.

Our copending application Serial No. 230,252, filed June 6, 1951, claims blends of (1) a polymer or copolymer of acrylonitrile having at least 90% by weight of acrylonitrile with (2) a copolymer of 45 to 55% acrylonitrile and 55 to 45% of a vinylpyridine.

We claim:

A fiber-forming composition comprising a blend of about 84 parts of a base polymer containing, by weight in the polymer molecule, about 95 percent of acrylonitrile and about 5 percent of vinyl acetate with about 16 parts of a substantially homogeneous modifying copolymer characterized by substantial uniformity of composition and molecular weight and containing by weight in the copolymer molecule, 50 percent of 2-vinylpyridine and 50 percent of methacrylonitrile.

References Cited in the file of this patent

UNITED STATES PATENTS

| Number | Name | Date |
|---|---|---|
| 2,404,714 | Latham | July 23, 1946 |
| 2,527,863 | Webb | Oct. 31, 1950 |